(12) United States Patent
Wang et al.

(10) Patent No.: US 10,742,385 B2
(45) Date of Patent: Aug. 11, 2020

(54) ENODEB, USER EQUIPMENT AND WIRELESS COMMUNICATION METHOD

(71) Applicant: Panasonic Intellectual Property Corporation of America, Torrance, CA (US)

(72) Inventors: Lilei Wang, Beijing (CN); Ayako Horiuchi, Kanagawa (JP); Alexander Golitschek Edler Von Elbwart, Hessen (DE); Masayuki Hoshino, Chiba (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 19 days.

(21) Appl. No.: 15/781,398

(22) PCT Filed: Feb. 2, 2016

(86) PCT No.: PCT/CN2016/073158
§ 371 (c)(1),
(2) Date: Jun. 4, 2018

(87) PCT Pub. No.: WO2017/132823
PCT Pub. Date: Aug. 10, 2017

(65) Prior Publication Data
US 2018/0367265 A1 Dec. 20, 2018

(51) Int. Cl.
*H04L 5/00* (2006.01)
*H04W 72/04* (2009.01)
*H04W 72/08* (2009.01)

(52) U.S. Cl.
CPC .......... *H04L 5/006* (2013.01); *H04L 5/0007* (2013.01); *H04L 5/0082* (2013.01);
(Continued)

(58) Field of Classification Search
CPC .... H04L 5/006; H04L 5/0064; H04W 72/048; H04W 72/085
See application file for complete search history.

(56) References Cited

U.S. PATENT DOCUMENTS

| | | | | |
|---|---|---|---|---|
| 2008/0049690 | A1* | 2/2008 | Kuchibhotla | H04W 72/0406 370/338 |
| 2012/0320782 | A1* | 12/2012 | Seo | H04L 1/1854 370/252 |

(Continued)

FOREIGN PATENT DOCUMENTS

| | | |
|---|---|---|
| JP | 2016-523018 A | 8/2016 |
| WO | 2014/172427 A1 | 10/2014 |

OTHER PUBLICATIONS

International Search Report of PCT application No. PCT/CN2016/073158 dated Oct. 11, 2016.

(Continued)

*Primary Examiner* — Walli Z Butt
*Assistant Examiner* — Ryan C Kavleski
(74) *Attorney, Agent, or Firm* — Seed IP Law Group LLP

(57) ABSTRACT

Provided are an eNB, a UE and wireless communication methods. A UE according to an embodiment of the present disclosure can comprise circuitry operative to determine valid transmission time interval(s) (TTI(s)) for a physical channel in a subframe based on the resource element (RE) number of each TTI in the subframe; and a receiver operative to receive the physical channel in one or more of the valid TTI(s) by blindly decoding part or all of the valid TTI(s), wherein each TTI comprises 1-7 orthogonal frequency division multiplexing (OFDM) symbols.

17 Claims, 5 Drawing Sheets

(52) U.S. Cl.
CPC ......... *H04L 5/0094* (2013.01); *H04W 72/048* (2013.01); *H04W 72/085* (2013.01); *H04L 5/0064* (2013.01)

(56) References Cited

U.S. PATENT DOCUMENTS

| | | | |
|---|---|---|---|
| 2015/0016431 A1* | 1/2015 | Ranta-Aho | H04W 72/0406 370/336 |
| 2017/0208616 A1* | 7/2017 | Panteleev | H04W 76/14 |
| 2018/0123769 A1* | 5/2018 | Pelletier | H04L 5/001 |
| 2018/0175987 A1* | 6/2018 | Shao | H04L 5/0035 |

OTHER PUBLICATIONS

CATT, System Analysis on TTI Shortening [online], 3GPP TSG-RAN WG1#83 R1-156613, Internet<URL:http://www.3gpp.org/ftp/tsg_ran/WG1_RL1/TSGR1_83/Docs/R1-156613.zip>, Nov. 15, 2015.

* cited by examiner

ENODEB, USER EQUIPMENT AND WIRELESS COMMUNICATION METHOD

BACKGROUND

1. Technical Field

The present disclosure relates to the field of wireless communication, and in particular, to an eNode B (eNB), a user equipment (UE), and wireless communication methods for transmission time interval (TTI) indication.

2. Description of the Related Art

Latency reduction is one topic in 3GPP, and the main method is to change TTI length for example from 1 ms to 1 orthogonal frequency division multiplexing (OFDM) symbol, which can largely reduce the transmission latency.

SUMMARY

One non-limiting and exemplary embodiment provides an approach to determine or indicate candidate TTI(s) for a physical channel.

In a first general aspect of the present disclosure, there is provided a user equipment (UE) comprising: circuitry operative to determine valid transmission time interval(s) (TTI(s)) for a physical channel in a subframe based on the resource element (RE) number of each TTI in the subframe; and a receiver operative to receive the physical channel in one or more of the valid TTI(s) by blindly decoding part or all of the valid TTI(s), wherein each TTI comprises 1-7 orthogonal frequency division multiplexing (OFDM) symbols.

In a second general aspect of the present disclosure, there is provided an eNode B (eNB) comprising: circuitry operative to determine valid transmission time interval(s) (TTI(s)) for a physical channel in a subframe based on the resource element (RE) number of each TTI in the subframe; and a transmitter operative to transmit the physical channel in one or more of the valid TTI(s) to a user equipment (UE), wherein each TTI comprises 1-7 orthogonal frequency division multiplexing (OFDM) symbols.

In a third general aspect of the present disclosure, there is provided an eNode B (eNB) comprising: circuitry operative to generate a bitmap indicating candidate transmission time interval(s) (TTI(s)) for a physical channel in a subframe; and a transmitter operative to transmit the bitmap in the radio resource control (RRC) or medium access control (MAC) layer, and transmit the physical channel in one or more of the candidate TTI(s), wherein each TTI in the subframe comprises 1-7 orthogonal frequency division multiplexing (OFDM) symbols, and the size of the bitmap depends on the lengths of TTIs in the subframe.

In a fourth general aspect of the present disclosure, there is provided a user equipment (UE) comprising: a receiver operative to receive a bitmap indicating candidate transmission time interval(s) (TTI(s)) for a physical channel in a subframe in the radio resource control (RRC) or medium access control (MAC) layer; and circuitry operative to determine the candidate TTI(s) based on the bitmap, wherein the receiver is also operative to receive the physical channel in one or more of the candidate TTI(s) by blindly decoding the candidate TTI(s), and each TTI in the subframe comprises 1-7 orthogonal frequency division multiplexing (OFDM) symbols, and the size of the bitmap depends on the lengths of TTIs in the subframe.

In a fifth general aspect of the present disclosure, there is provided a wireless communication method performed by a user equipment (UE) comprising: determining valid transmission time interval(s) (TTI(s)) for a physical channel in a subframe based on the resource element (RE) number of each TTI in the subframe; and receiving the physical channel in one or more of the valid TTI(s) by blindly decoding part or all of the valid TTI(s), wherein each TTI comprises 1-7 orthogonal frequency division multiplexing (OFDM) symbols.

In a sixth general aspect of the present disclosure, there is provided a wireless communication method performed by an eNode B (eNB), comprising: determining valid transmission time interval(s) (TTI(s)) for a physical channel in a subframe based on the resource element (RE) number of each TTI in the subframe; and transmitting the physical channel in one or more of the valid TTI(s) to a user equipment (UE), wherein each TTI comprises 1-7 orthogonal frequency division multiplexing (OFDM) symbols.

In a seventh general aspect of the present disclosure, there is provided a wireless communication method performed by an eNode B (eNB) comprising: generating a bitmap indicating candidate transmission time interval(s) (TTI(s)) for a physical channel in a subframe; transmitting the bitmap in the radio resource control (RRC) or medium access control (MAC) layer; transmitting the physical channel in one or more of the candidate TTI(s), wherein each TTI in the subframe comprises 1-7 orthogonal frequency division multiplexing (OFDM) symbols, and the size of the bitmap depends on the lengths of TTIs in the subframe.

In an eighth general aspect of the present disclosure, there is provided a wireless communication method performed by a user equipment (UE) comprising: receiving a bitmap indicating candidate transmission time interval(s) (TTI(s)) for a physical channel in a subframe in the radio resource control (RRC) or medium access control (MAC) layer; determining the candidate TTI(s) based on the bitmap; and receiving the physical channel in one or more of the candidate TTI(s) by blindly decoding the candidate TTI(s), wherein each TTI in the subframe comprises 1-7 orthogonal frequency division multiplexing (OFDM) symbols, and the size of the bitmap depends on the lengths of TTIs in the subframe.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figures 1, 2:
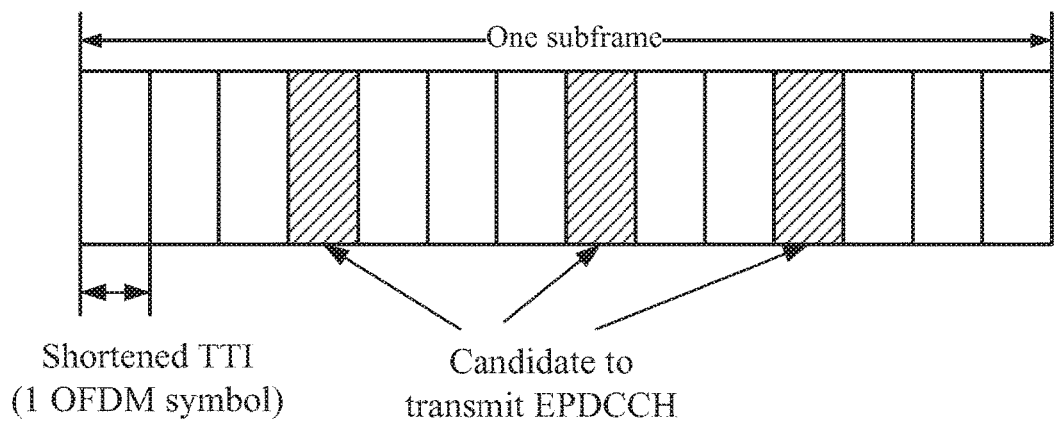
FIG. 1 schematically illustrates some examples of TTI length reduction.
FIG. 2 schematically illustrates candidate TTIs for transmitting EPDCCH in a subframe.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

Latency reduction is a topic in 3GPP RAN1 and the main method is to reduce TTI length for example from 1 ms to 1-7 OFDM symbols so that transmission latency can be reduced. FIG. 1 shows some examples of TTI length reduction. In FIG. 1, from the top to the bottom, the first plot shows normal TTIs, that is, the TTI length is one subframe; the second plot shows TTIs whose length is 1 slot (7 OFMD symbols); the third plot shows TTIs whose length is 4 or 3 OFDM symbols (for example, the first and the third TTIs in a subframe have 4 OFDM symbols, and the second and the fourth TTIs have 3 OFDM symbols); the fourth plot shows TTIs whose length is 1 OFDM symbol.

Normally, one physical channel such as an EPDCCH or PDSCH is transmitted in one TTI regardless of how long the TTI is. If the TTI length is 1 OFDM symbol, the physical channel will be transmitted in 1 OFDM symbol; if the TTI length is 7 OFDM symbols, the physical channel will be transmitted in 7 OFDM symbols. It is noted that TTI is a general terminology which can be used for any channel transmission. For example, the physical channel herein can refer to any downlink channel such as EPDCCH and PDSCH.

Taking EPDCCH as an example, assuming one shortened TTI whose length is smaller than one subframe transmits one EPDCCH, it is not feasible to assume all TTIs of a subframe are potential to transmit the EPDCCH as it will largely increase UE's blind decoding (BD) times in the subframe and cause large UE complexity. Therefore, it is proposed that only some TTIs in a subframe are configured to be candidates to transmit the EPDCCH. FIG. 2 schematically illustrates candidate TTIs for transmitting EPDCCH in a subframe, wherein the length of the TTIs is one OFDM symbol. In the example of FIG. 2, the EPDCCH can only be transmitted in the candidate TTIs, and the UE only needs to blindly decode the candidate TTIs. In such a way, the BD times can be reduced.

In order for the above mechanism in which a physical channel is only transmitted in candidate TTIs for the physical channel in a subframe to work, the UE should know which TTIs are the candidate TTIs for the physical channel.

In an embodiment of the present disclosure, a 14 bit bitmap in the radio resource control (RRC) or medium access control (MAC) layer can be used to indicate the candidate TTIs to each UE. This 14 bit bitmap can be used for all possible TTI lengths. For TTIs with the length of 1 OFDM symbol, each bit in the 14 bit bitmap indicates whether one TTI is a candidate TTI, for example, bit "1" means candidate, and bit "0" means non-candidate. For TTIs with larger length, 2 or more bits can be used to indicate one TTI's situation, for example, for TTIs with the length of 2 OFDM symbols, 2 bits can be used to indicate one TTI's situation.

In the above embodiment, a unified 14 bitmap is used for all possible TTI lengths, which may cause relatively large overhead. In another embodiment, the size of the bitmap to indicate candidate TTIs in a subframe can depend on the lengths of TTIs in the subframe. Based on the lengths of the TTIs, the number of TTIs in a subframe can be calculated, and the bit number of the bitmap can be corresponding to (e.g., equal to) the number of the TTIs.

For example, when the lengths of all the TTIs are the same in a subframe, if the TTI length is 1 OFDM symbol, then the number of TTIs in a normal subframe is 14, and a 14 bit bitmap can be used; if the TTI length is 7 OFDM symbols, then the number of TTIs in a normal subframe is 2, and a 2 bit bitmap can be used. For special cases, if the TTI length is not an exact divider of 14 (the number of OFDM symbols of a normal subframe), at least two TTIs in the subframe can be arranged to overlap each other, or some OFDM symbols (for example, the last m OFDM symbols, where m is the remainder when 14 is divided by the TTI length) in the subframe can be not assigned to the TTIs. For example, if the TTI length is 4, then there can be 4 TTIs in the subframe by overlapping the first TTI and the second TTI with one OFDM symbol (that is, the ending OFDM symbol of the first TTI is the starting OFDM symbol of the second TTI) and overlapping the third TTI and the fourth TTI with one OFDM symbol (that is, the ending OFDM symbol of the third TTI is the starting OFDM symbol of the fourth TTI), and thus a 4 bit bitmap can be used; alternatively, there can be 3 TTIs in the subframe by not assigning the last two OFDM symbols in the subframe to any TTI, and thus a 3 bit bitmap can be used.

In another example, the lengths of the TTIs can be not all the same in a subframe in order to make full use of the OFDM symbols of the subframe, such as the TTI arrangement shown in the third plot in FIG. 2, in which the lengths of the first TTI and the third TTI in the subframes are 4 OFDM symbols, and the lengths of the second TTI and the fourth TTI are 3 OFDM symbols. In this case, the number of TTIs can be counted based on the specific TTI arrangement in the subframe. For the example shown in the third plot in FIG. 2, the number of TTIs in the subframe is 4, and a 4 bit bitmap can be used.

Figure 3:
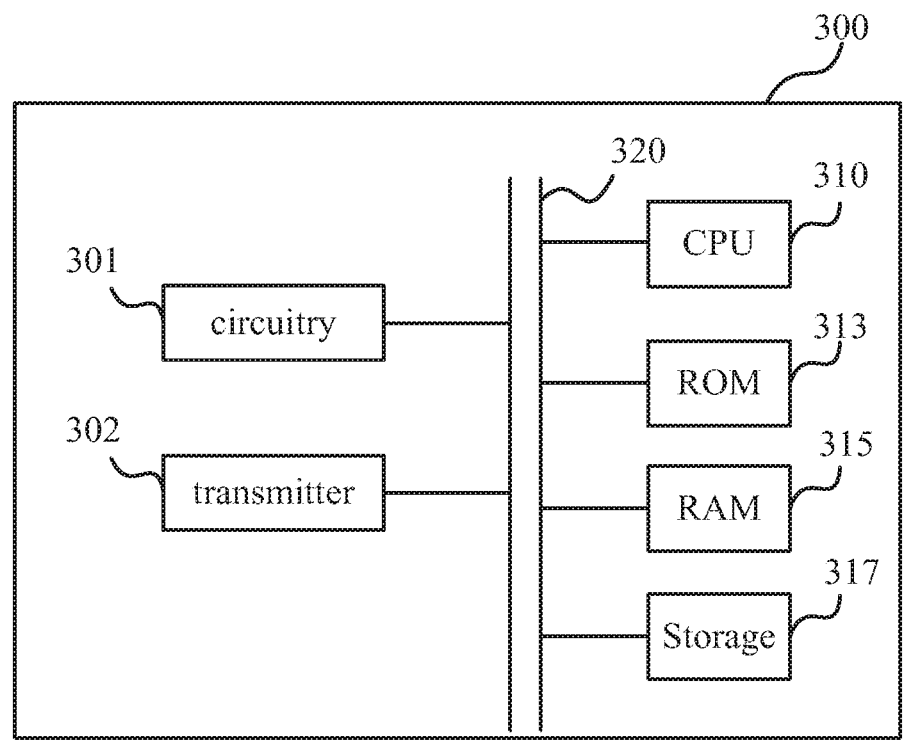
FIG. 3 schematically illustrates a block diagram of an eNB according to an embodiment of the present disclosure.

Based on the above concept of using different bitmaps for different subframes with different TTI lengths or numbers, an embodiment of the present disclosure provides an eNB 300 as shown in FIG. 3 which schematically illustrates a block diagram of the eNB 300 according to an embodiment of the present disclosure. The eNB 300 can comprise circuitry 301 operative to generate a bitmap indicating candidate TTI(s) (i.e., one or more TTIs) for a physical channel in a subframe; and a transmitter 302 operative to transmit the bitmap in the RRC or MAC layer to a UE, and transmit the physical channel in one or more of the candidate TTI(s) to the UE. Each TTI in the subframe comprises 1-7 OFDM symbols, and the size of the bitmap depends on the lengths of TTIs in the subframe. Exemplary ways of determining the size of the bitmap can refer to the above description on determining the TTI number and the bitmap size.

In the embodiment, the eNB 300 transmits a bitmap whose size depends on the lengths of TTIs in a subframe in the RRC or MAC layer to a UE for the UE to determine the candidate TTI(s) in the subframe. Therefore, the bitmap size can be optimized, and the overhead can be reduced. It is noted that, in the present disclosure, one physical channel (such as EPDCCH and PDSCH) can be transmitted in one or more candidate TTIs. When one physical channel is transmitted in multiple TTIs, the UE can jointly decode the multiple TTIs carrying the physical channel.

In an embodiment, the lengths of the TTIs in the subframe can be UE-specific, in other words, not all UEs are configured by the same TTI length. As an example, the lengths of the TTIs in the subframe depend on UE's coverage situation. For example, for a cell-edge UE whose radio condition is relatively bad, it is reasonable to configure more OFDM symbols as the TTI length since the channel estimation performance will be relatively bad; for a cell-center UE who has relatively good radio condition, it is reasonable to configure shorter TTI length (for example, 1 OFDM symbol) since the channel estimation performance will be relatively good. The eNB can judge UE's coverage situation from a received uplink signal or the Reference Signal Received Power (RSRP) report.

In an embodiment of eNB 300, the special or partial subframes can use the same bitmap as the normal subframes. Herein, the "special subframe" is as defined in the specification 3GPP TS 36.211 concerning TDD, and the "partial subframe" is a subframe where the transmission starts in the $2^{nd}$ slot of the subframe as defined in the specification 3GPP TS 36.211 concerning unlicensed carrier access. The bitmap size for the normal subframes can be determined as described in the above. If the subframe is a special or partial subframe, n bits (for example, the first n bits) of the bitmap are applied to indicate the candidate TTI(s), and n depends on the number of TTIs in the special or partial subframe. For example, in the case of special subframe configuration 0 whose symbol number of DwPTS is 3, if the TTI length is 4 OFDM symbols, the bitmap of "1100" can mean that the first and second TTIs of the special subframe and the normal subframe are candidate TTIs. Alternatively, a special bitmap can be used to indicate which TTI(s) are candidate TTI(s) in a special or partial subframe, and the size of the special bitmap can be determined based on the number of TTIs in the special or partial subframe.

In addition, as shown in FIG. 3, the eNB 300 according to the present disclosure may optionally include a CPU (Central Processing Unit) 310 for executing related programs to process various data and control operations of respective units in the eNB 300, a ROM (Read Only Memory) 313 for storing various programs required for performing various process and control by the CPU 310, a RAM (Random Access Memory) 315 for storing intermediate data temporarily produced in the procedure of process and control by the CPU 310, and/or a storage unit 317 for storing various programs, data and so on. The above circuitry 301, and transmitter 302, CPU 310, ROM 313, RAM 315 and/or storage unit 317 etc. may be interconnected via data and/or command bus 320 and transfer signals between one another.

Respective components as described above do not limit the scope of the present disclosure. According to one implementation of the disclosure, the functions of the above circuitry 301 and transmitter 302 may be implemented by hardware, and the above CPU 310, ROM 313, RAM 315 and/or storage unit 317 may not be necessary. Alternatively, the functions of the above circuitry 301 and transmitter 302 may also be implemented by functional software in combination with the above CPU 310, ROM 313, RAM 315 and/or storage unit 317 etc.

Figure 4:
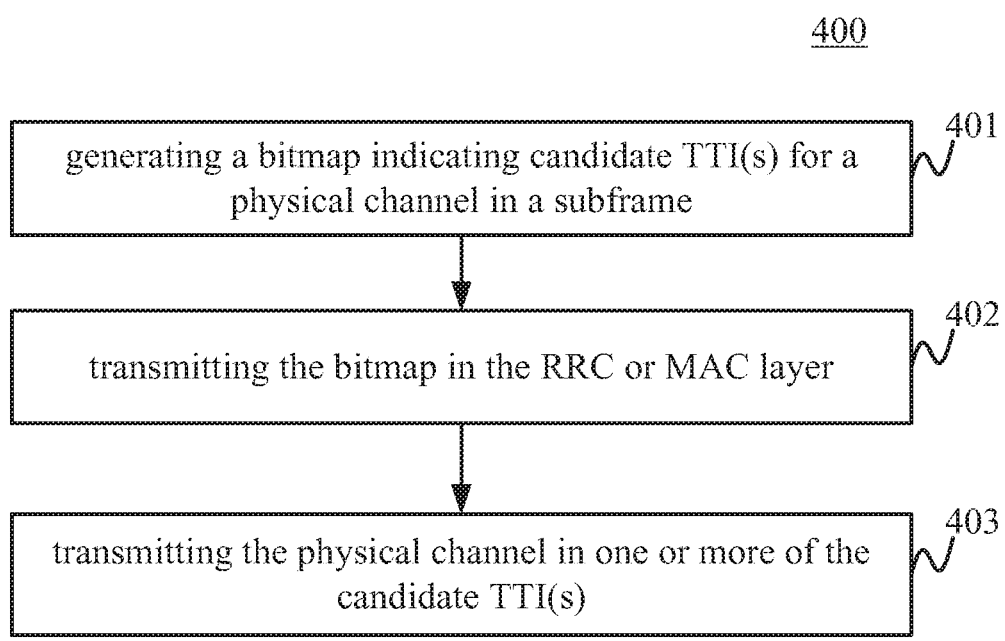
FIG. 4 illustrates a flowchart of a wireless communication method performed by an eNB according to an embodiment of the present disclosure.

FIG. 4 illustrates a flowchart of a wireless communication method 400 performed by an eNB (e.g. the eNB 300) according to an embodiment of the present disclosure. The wireless communication method 400 can comprise a step 401 of generating a bitmap indicating candidate TTI(s) for a physical channel in a subframe, a step 402 of transmitting the bitmap in the RRC or MAC layer to a UE, and a step 403 of transmitting the physical channel in one or more of the candidate TTI(s) to the UE. Each TTI in the subframe comprises 1-7 OFDM symbols, and the size of the bitmap depends on the lengths of TTIs in the subframe. The details and benefits described in the above for eNB 300 can also be applied to the wireless communication method 400.

Accordingly, embodiments of the present disclosure also provide a UE and a wireless communication method performed by the UE.

Figure 5:
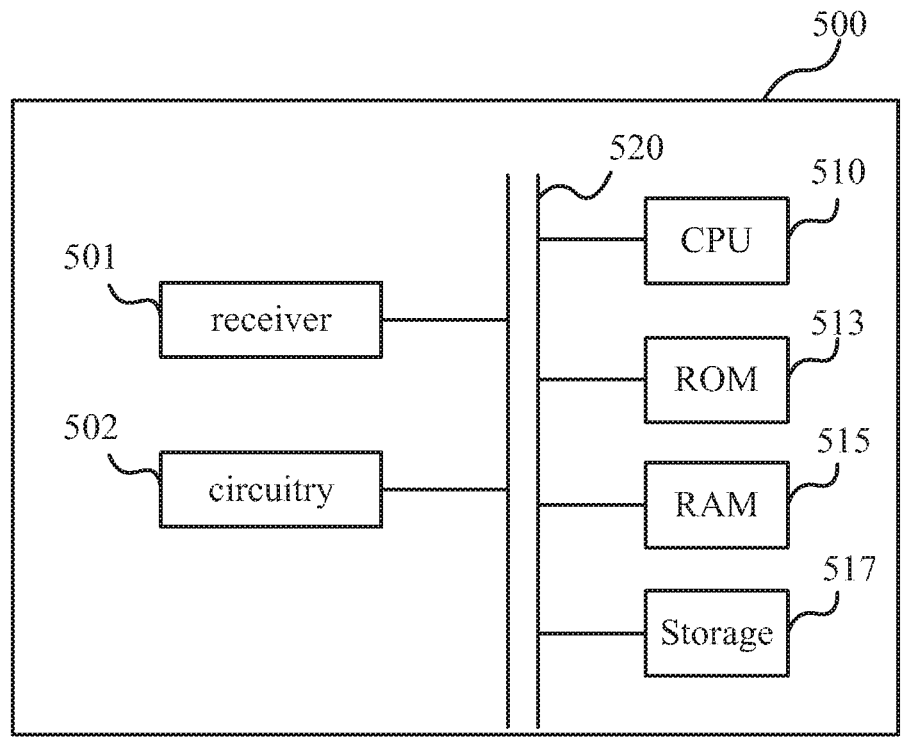
FIG. 5 schematically illustrates a block diagram of a UE according to an embodiment of the present disclosure.

FIG. 5 schematically illustrates a block diagram of a UE 500 according to an embodiment of the present disclosure. The UE 500 can comprise: a receiver 501 operative to receive a bitmap indicating candidate TTI(s) for a physical channel in a subframe in the RRC or MAC layer; and circuitry 502 operative to determine the candidate TTI(s) based on the bitmap, wherein the receiver is also operative to receive the physical channel in one or more of the candidate TTI(s) by blindly decoding the candidate TTI(s), and each TTI in the subframe comprises 1-7 orthogonal frequency division multiplexing (OFDM) symbols, and the size of the bitmap depends on the lengths of TTIs in the subframe. In the embodiment, the UE 500 can obtain the information on the candidate TTI(s) based on the bitmap, and thus can only blindly decode the candidate TTI(s) to receive the physical channel transmitted in one or more of the candidate TTI(s).

The UE 500 according to the present disclosure may optionally include a CPU (Central Processing Unit) 510 for executing related programs to process various data and control operations of respective units in the UE 500, a ROM (Read Only Memory) 513 for storing various programs required for performing various process and control by the CPU 510, a RAM (Random Access Memory) 515 for storing intermediate data temporarily produced in the procedure of process and control by the CPU 510, and/or a storage unit 517 for storing various programs, data and so on. The above receiver 501, circuitry 502, CPU 510, ROM 513, RAM 515 and/or storage unit 517 etc. may be interconnected via data and/or command bus 520 and transfer signals between one another.

Respective components as described above do not limit the scope of the present disclosure. According to one implementation of the disclosure, the functions of the above receiver 501 and circuitry 502 may be implemented by hardware, and the above CPU 510, ROM 513, RAM 515 and/or storage unit 517 may not be necessary. Alternatively, the functions of the above receiver 501 and circuitry 502 may also be implemented by functional software in combination with the above CPU 510, ROM 513, RAM 515 and/or storage unit 517 etc.

Figure 6:
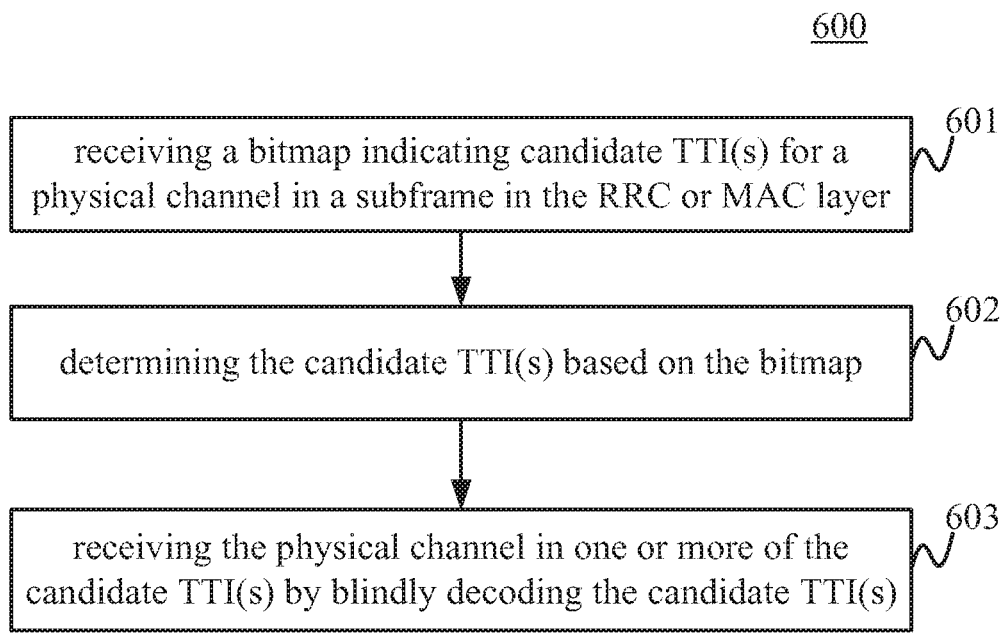
FIG. 6 illustrates a flowchart of a wireless communication method performed by a UE according to an embodiment of the present disclosure.

FIG. 6 illustrates a flowchart of a wireless communication method 600 performed by a UE (e.g., the UE 500) according to an embodiment of the present disclosure. The wireless communication method 600 can comprise a step 601 of receiving a bitmap indicating candidate TTI(s) for a physical channel in a subframe in the RRC or MAC layer, a step 602 of determining the candidate TTI(s) based on the bitmap, and a step 603 of receiving the physical channel in one or more of the candidate TTI(s) by blindly decoding the candidate TTI(s), wherein each TTI in the subframe comprises 1-7 OFDM symbols, and the size of the bitmap depends on the lengths of TTIs in the subframe.

It is noted that the details and benefits described in the above for the eNB side can also be applied to the UE side, unless the context indicates otherwise.

In another embodiment of the present disclosure, in order to determine candidate TTI(s) for transmitting a physical channel in a subframe, valid TTI(s) for the physical channel are determined based on RE number of each TTI in the subframe. The "valid TTI" for a physical channel herein refers to a TTI capable of transmitting the physical channel. For example, in the case that one TTI transmits one physical channel, if the RE number of the TTI is enough to transmit the physical channel, the TTI is a valid TTI. When it is configured that one physical channel can be transmitted in multiple TTIs, if the total RE number of the multiple TTIs is enough to transmit the physical channel, the multiple TTIs are valid TTIs. Since the physical channel is only possible to be transmitted in the valid TTI(s), the UE only needs to at most blindly decode the valid TTI(s) to receive the physical channel. In one example, all the valid TTI(s) are all taken as candidate TTI(s) for transmitting the physical channel, and there is no bitmap to further indicate candidate TTI(s); therefore, the UE needs to blindly decode all the valid TTI(s). In another example, there is a bitmap applied to the valid TTI(s) to further indicate which TTI(s) among the valid TTI(s) is candidate TTI(s) for the physical channel. In either example, the signaling overhead can be reduced. Particularly, for the latter example, since the bitmap can be only applied to the valid TTI(s) rather than all the TTIs in a subframe, its size can be reduced.

Figure 7:
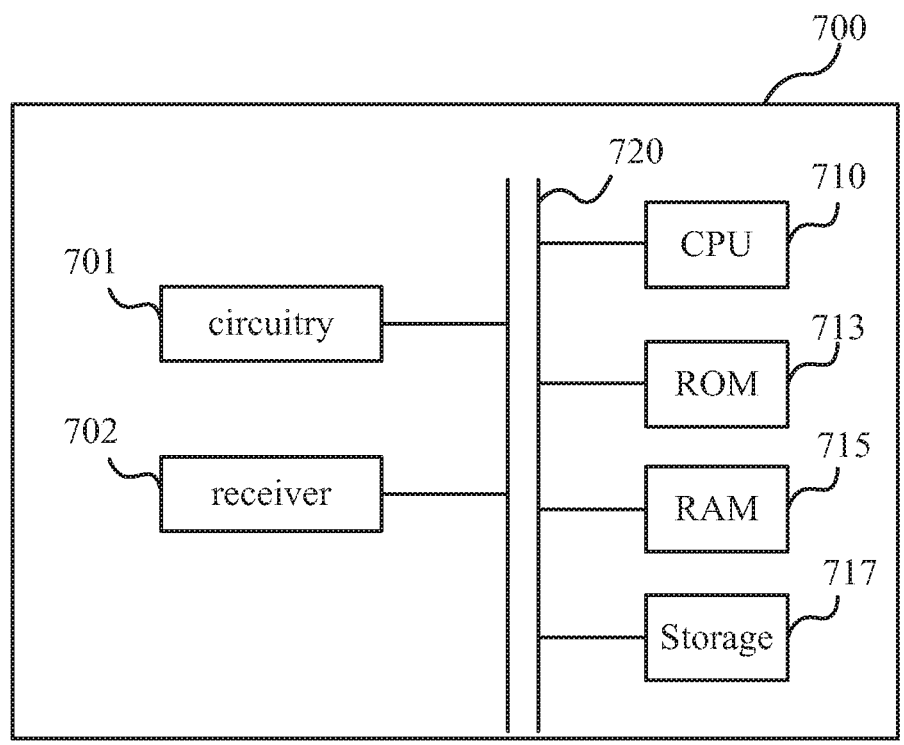
FIG. 7 schematically illustrates a block diagram of a UE according to an embodiment of the present disclosure.

Based on the above concept of determining valid TTIs based on the RE number of each TTI in a subframe, an embodiment of the present disclosure provides a UE 700 as shown in FIG. 7 which schematically illustrates a block diagram of the UE 700 according to an embodiment of the present disclosure. The UE 700 can comprise: circuitry 701 operative to determine valid TTI(s) for a physical channel in a subframe based on the RE number of each TTI in the subframe; and a receiver 702 operative to receive the physical channel in one or more of the valid TTI(s) by blindly decoding part or all of the valid TTI(s), wherein each TTI comprises 1-7 OFDM symbols. In the embodiment, the UE can obtain the information on valid TTI(s) based on the RE number of each TTI, and thus only need to blindly decode at most the valid TTI(s) rather than all the TTIs in the subframe. It is noted that the above descriptions on FIG. 5 can be applicable to the UE 700 in FIG. 7 unless the context indicates otherwise.

Considering EPDCCH as the physical channel, reference signal configuration (for example CSI-RS dropping behavior, periodicity, CRS port number and PDCCH configuration) and MBSFN configuration will impact the RE number in a TTI for transmitting the EPDCCH. As an example, the following assumptions can be made.

DCI size is 32 bits (including CRC), and QPSK and ⅓ coding rate are adopted, so the required RE number to transmit such a DCI is 32×3/2=48.

4 PRBs are allocated for a shortened TTI in a subframe and the TTI length is 1 OFDM symbol.

Figure 8:
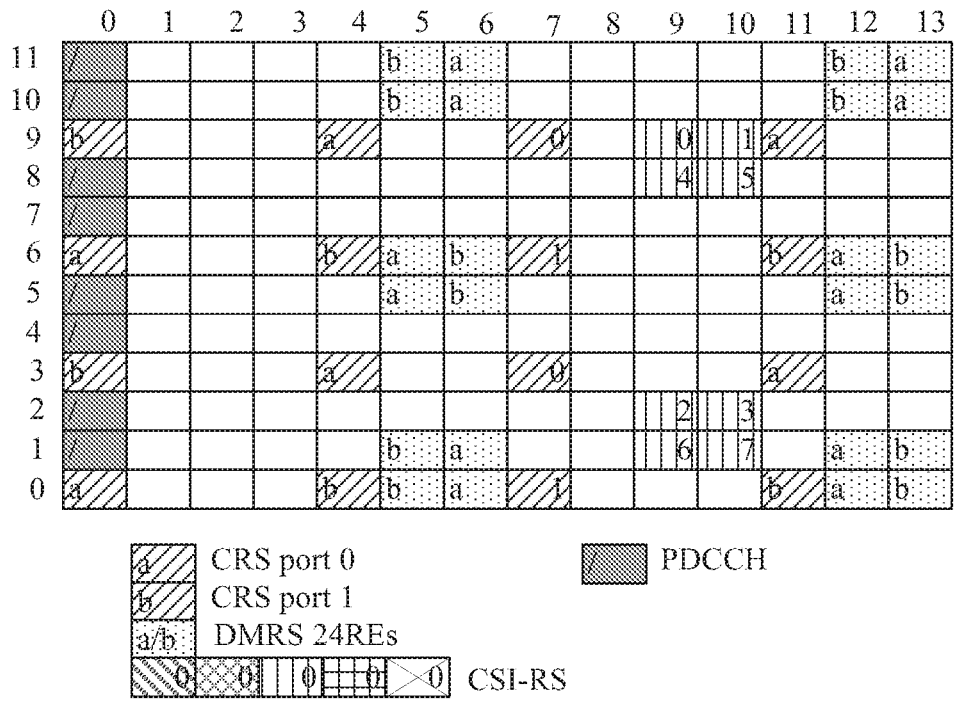
FIG. 8 schematically illustrates reference signal assumption in an example.
Figure 9:
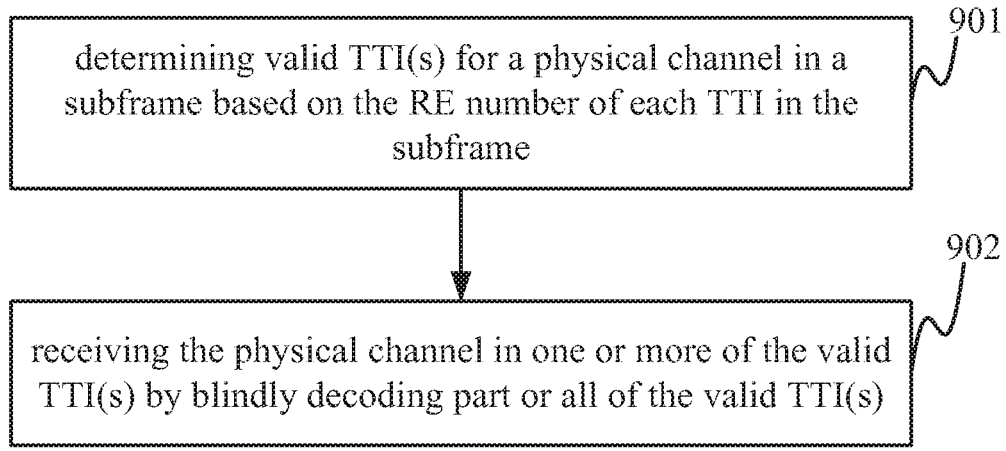
FIG. 9 illustrates a flowchart of a wireless communication method performed by a UE according to an embodiment of the present disclosure.

Reference signal assumption is as shown in FIG. 8 which schematically illustrates reference signal assumption in an example. In FIG. 9, two CRS ports, 24 DMRS REs, 8 port CSI-RS and one OFDM symbol PDCCH are assumed in a PRB. In OFDM symbol (or TTI) 0, as PDCCH occupies the whole PRB, available RE number for EPDCCH is zero. In OFDM symbol (or TTI) 5, 6, 12 and 13, as DMRS RE number in a PRB is 6, available RE number for EPDCCH is 6. Other OFDM symbols' available RE number can be calculated in similar ways.

Based on above assumptions, the RE number in each TTI of one subframe can be determined as shown in Table 1. Since the required RE number for transmitting the above DCI is 48, only TTIs (or OFDM symbols) 1, 2, 3 and 8 are valid for EPDCCH.

TABLE 1

| TTI | Number of REs per PRB | PRB number in frequency | Total RE number | Valid or not for EPDCCH |
| --- | --- | --- | --- | --- |
| 0 | 0 | 4 | 0 | N |
| 1 | 12 | 4 | 48 | Valid |
| 2 | 12 | 4 | 48 | Valid |
| 3 | 12 | 4 | 48 | Valid |
| 4 | 8 | 4 | 32 | N |
| 5 | 6 | 4 | 24 | N |
| 6 | 6 | 4 | 24 | N |
| 7 | 8 | 4 | 32 | N |
| 8 | 12 | 4 | 48 | Valid |
| 9 | 8 | 4 | 32 | N |
| 10 | 8 | 4 | 32 | N |
| 11 | 8 | 4 | 32 | N |
| 12 | 6 | 4 | 24 | N |
| 13 | 6 | 4 | 24 | N |

In one embodiment, all the valid TTI(s) are taken as candidate TTI(s), and the UE 700 will blindly decode all the valid TTI(s). In the above example shown in Table 1, the four valid TTIs can be taken as candidate TTIs for EPDCCH.

Alternatively, in another embodiment, a bitmap applied to the valid TTI(s) can be send from the eNB to further indicate which TTI(s) among the valid TTI(s) is candidate TTI(s) for the physical channel. Accordingly, the receiver 702 can be further operative to receive a bitmap in the RRC or MAC layer indicating candidate TTI(s) for the physical channel among the valid TTI(s); the one or more of the valid TTI(s) for transmitting the physical channel is among the candidate TTI(s), and the receiver 702 can be operative to blindly decode the candidate TTI(s) when receiving the physical channel. Here, the size of the bitmap can be equal to the number of the valid TTI(s) in the subframe since the bitmap can be only applied to the valid TTI(s), so its size can be smaller than a bitmap applied to all the TTIs in the subframe. For the above example shown in Table 1, a 4 bit bitmap can be used to indicate which TTI(s) in the four valid TTIs are candidate TTI(s) for the EPDCCH. Alternatively, the size of the bitmap can be equal to the largest one of the numbers of valid TTI(s) in respective subframes available to the UE. There are different types of subframes, for example, MBSFN (Multicast Broadcast Single Frequency Network)

subframe and non-MBSFN subframe, and some RSs like CSI-RS may not exist in every subframe. Therefore, different types of subframes can have different situations on valid TTI number. For the example shown in FIG. 8, the CSI-RS may not exist in some subframes, so the TTIs (OFDM symbols) 9 and 10 may be valid TTIs for the EPDCCH in some subframes. Therefore, in order to use the same bitmap for different types of subframes (for example, the one shown in FIG. 7 with CSI-RS in OFDM symbols 9 and 10, and the one without CSI-RS in OFDM symbols 9 and 10), the size of the bitmap can be the largest size suitable for all types of subframes, that is, be equal to the largest one of the numbers of valid TTI(s) in respective subframes available to the UE. In the above example shown in FIG. 8 and Table 1, a 6 bit bitmap can be used to indicate symbols (TTIs) 1, 2, 3, 8, 9 and 10. For a subframe with CSI-RS, the bits in the bitmap for symbols 9 and 10 are not valid.

Usually, one physical channel is only transmitted in one TTI. However, sometimes, too few valid TTIs may exist in a subframe if one physical channel is only transmitted in one TTI. Therefore, as proposed in the present disclosure, multiple TTIs can be used to transmit one physical channel such as EPDCCH. In the case that the RE number of each individual TTI of a set of TTIs in a subframe is not enough to transmit the physical channel, if the total RE number of the set of TTIs is enough to transmit the physical channel, the set of TTIs can be determined as valid, the set of TTIs in combination are used to transmit the physical channel, and the receiver 702 can jointly decode the set of TTIs. For example, assuming two consecutive TTIs can transmit one EPDCCH, in the example shown in FIG. 8 and Table 1, among the invalid TTIs 0, 4, 5, 6, 7, 9, 10, 11, 12 and 13 when the EPDCCH can only be transmitted in one TTI, the combinations of TTIs 4 and 5, 6 and 7, and 9 and 10 can also be determined as valid since each of the combinations has more than 48 REs, as shown in Table 2. This can increase the capacity of shortened TTI transmission. In an embodiment, the EPDCCH over two TTIs can only be transmitted in TTIs which are invalid when the EPDCCH is only transmitted in one TTI.

TABLE 2

| TTI | Number of REs per PRB | PRB number in frequency | Total RE number | Valid for 1 TTI transmission | Valid for 2 TTI transmission |
|---|---|---|---|---|---|
| 0 | 0 | 4 | 0 | N | |
| 1 | 12 | 4 | 48 | Valid | |
| 2 | 12 | 4 | 48 | Valid | |
| 3 | 12 | 4 | 48 | Valid | |
| 4 | 8 | 4 | 32 | N | Valid |
| 5 | 6 | 4 | 24 | N | |
| 6 | 6 | 4 | 24 | N | Valid |
| 7 | 8 | 4 | 32 | N | |
| 8 | 12 | 4 | 48 | Valid | |
| 9 | 8 | 4 | 32 | N | Valid |
| 10 | 8 | 4 | 32 | N | |
| 11 | 8 | 4 | 32 | N | Valid |
| 12 | 6 | 4 | 24 | N | |
| 13 | 6 | 4 | 24 | N | |

In an embodiment of the present disclosure, there is also provided a wireless communication method 900 performed by the above UE 700. FIG. 9 illustrates a flowchart of a wireless communication method 900 performed by a UE according to an embodiment of the present disclosure. The wireless communication 900 can comprise: a step 901 of determining valid TTI(s) for a physical channel in a subframe based on the RE number of each TTI in the subframe; and a step 902 of receiving the physical channel in one or more of the valid TTI(s) by blindly decoding part or all of the valid TTI(s), wherein each TTI comprises 1-7 OFDM symbols. The details and benefits described for the above UE 700 can also be applied to the wireless communication method 900.

At the eNB side, embodiments of the present disclosure provide an eNB and a wireless communication method performed by the eNB.

Figure 10:
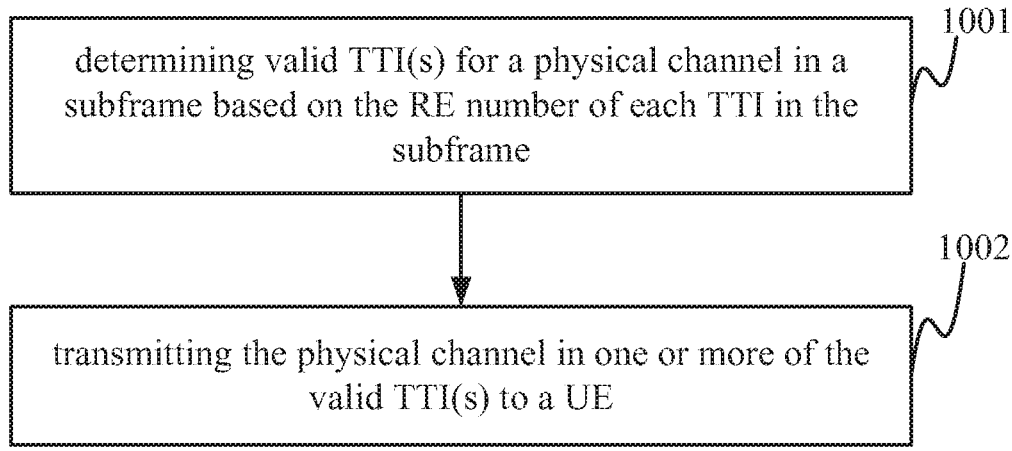
FIG. 10 illustrates a flowchart of a wireless communication method performed by an eNB according to an embodiment of the present disclosure.

FIG. 10 illustrates a flowchart of a wireless communication method 1000 performed by an eNB according to an embodiment of the present disclosure. The wireless communication method 1000 can comprise a step 1001 of determining valid TTI(s) for a physical channel in a subframe based on the RE number of each TTI in the subframe; and a step 1002 of transmitting the physical channel in one or more of the valid TTI(s) to a UE, wherein each TTI comprises 1-7 OFDM symbols. Optionally, the method 1000 can also comprise transmitting a bitmap in the RRC or MAC layer indicating candidate TTI(s) for the physical channel among the valid TTI(s) to the UE, wherein the size of the bitmap is equal to the number of the valid TTI(s) in the subframe or the largest one of the numbers of valid TTI(s) in respective subframes available to the UE, and the one or more of the valid TTI(s) for transmitting the physical channel is among the candidate TTI(s).

An embodiment of the present disclosure also provides an eNB for performing the above method 1000, which can comprise: circuitry operative to determine valid TTI(s) for a physical channel in a subframe based on the RE number of each TTI in the subframe; and a transmitter operative to transmit the physical channel in one or more of the valid TTI(s) to a UE, wherein each TTI comprises 1-7 OFDM symbols. Optionally, the transmitter can be further operative to transmit a bitmap in the RRC or MAC layer indicating candidate TTI(s) for the physical channel among the valid TTI(s) to a UE, wherein the size of the bitmap is equal to the number of the valid TTI(s) in the subframe or the largest one of the numbers of valid TTI(s) in respective subframes available to the UE, wherein the one or more of the valid TTI(s) for transmitting the physical channel is among the candidate TTI(s). The block diagram of the eNB in this embodiment can refer to the structure shown in FIG. 3.

It is noted that the details and benefits described in the above for the UE side can also be applied to the eNB side, unless the context indicates otherwise.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

1. A user equipment (UE) comprising:
circuitry operative to determine valid transmission time interval(s) (TTI(s)) for a physical channel in a subframe based on the resource element (RE) number of each TTI in the subframe; and
a receiver operative to receive the physical channel in one or more of the valid TTI(s) by blindly decoding part or all of the valid TTI(s),
wherein each TTI comprises 1-7 orthogonal frequency division multiplexing (OFDM) symbols.

2. The user equipment according to 1, wherein
the receiver is further operative to receive a bitmap in the radio resource control (RRC) or medium access control (MAC) layer indicating candidate TTI(s) for the physical channel among the valid TTI(s), wherein the size of the bitmap is equal to the number of the valid TTI(s) in the subframe or the largest one of the numbers of valid TTI(s) in respective subframes available to the UE; and
the one or more of the valid TTI(s) for transmitting the physical channel is among the candidate TTI(s), and the receiver is operative to blindly decode the candidate TTI(s) when receiving the physical channel.

3. The user equipment according to 2, wherein
the same bitmap is used for different types of subframes, and
the size of the bitmap is equal to the largest one of the numbers of valid TTI(s) in respective subframes available to the UE.

4. The user equipment according to 1, wherein
the receiver is operative to blindly decode all the valid TTI(s) when receiving the physical channel.

5. The user equipment according to 1, wherein
the circuitry is further operative to determine that a set of TTIs in the subframe are valid TTIs if the total RE number of the set of TTIs is enough to transmit the physical channel in the case that the RE number of each individual TTI of the set of TTIs is not enough to transmit the physical channel, wherein the set of TTIs in combination are used to transmit the physical channel.

6. An eNode B (eNB) comprising:
circuitry operative to determine valid transmission time interval(s) (TTI(s)) for a physical channel in a subframe based on the resource element (RE) number of each TTI in the subframe; and
a transmitter operative to transmit the physical channel in one or more of the valid TTI(s) to a user equipment (UE), wherein each TTI comprises 1-7 orthogonal frequency division multiplexing (OFDM) symbols.

7. The eNode B according to 6, wherein
the transmitter is further operative to transmit a bitmap in the radio resource control (RRC) or medium access control (MAC) layer indicating candidate TTI(s) for the physical channel among the valid TTI(s) to the UE, wherein the size of the bitmap is equal to the number of the valid TTI(s) in the subframe or the largest one of the numbers of valid TTI(s) in respective subframes available to the UE, and
the one or more of the valid TTI(s) for transmitting the physical channel is among the candidate TTI(s).

8. The eNode B according to 7, wherein
the same bitmap is used for different types of subframes, and
the size of the bitmap is equal to the largest one of the numbers of valid TTI(s) in respective subframes available to the UE.

9. The eNode B according to 6, wherein
the transmitter is operative to transmit the physical channel in one or more of the valid TTI(s) by taking all the valid TTI(s) as candidate TTI(s) for the physical channel.

10. The eNode B according to 6, wherein
the circuitry is further operative to determine that a set of TTIs in the subframe are valid TTIs if the total RE number of the set of TTIs is enough to transmit the physical channel in the case that the RE number of each individual TTI of the set of TTIs is not enough to transmit the physical channel, wherein the set of TTIs in combination are used to transmit the physical channel.

11. An eNode B (eNB) comprising:
circuitry operative to generate a bitmap indicating candidate transmission time interval(s) (TTI(s)) for a physical channel in a subframe; and
a transmitter operative to transmit the bitmap in the radio resource control (RRC) or medium access control (MAC) layer, and transmit the physical channel in one or more of the candidate TTI(s),
wherein each TTI in the subframe comprises 1-7 orthogonal frequency division multiplexing (OFDM) symbols, and the size of the bitmap depends on the lengths of TTIs in the subframe.

12. The eNode B according to 11, wherein
the lengths of the TTIs in the subframe are user equipment (UE)-specific.

13. The eNode B according to 12, wherein
the lengths of the TTIs in the subframe depend on UE's coverage situation.

14. The eNode B according to 11, wherein
the lengths of the TTIs in the subframe are all the same; and
if the lengths of the TTIs are not an exact divider of 14, at least two TTIs in the subframe are arranged to overlap each other, or some OFDM symbols in the subframe are not assigned to the TTIs.

15. The eNode B according to 11, wherein
If the subframe is a special or partial subframe, n bits of the bitmap are applied to indicate the candidate TTI(s), and n depends on the number of TTIs in the special or partial subframe.

16. A user equipment (UE) comprising:
a receiver operative to receive a bitmap indicating candidate transmission time interval(s) (TTI(s)) for a physical channel in a subframe in the radio resource control (RRC) or medium access control (MAC) layer; and
circuitry operative to determine the candidate TTI(s) based on the bitmap,
wherein the receiver is also operative to receive the physical channel in one or more of the candidate TTI(s) by blindly decoding the candidate TTI(s), and
each TTI in the subframe comprises 1-7 orthogonal frequency division multiplexing (OFDM) symbols, and the size of the bitmap depends on the lengths of TTIs in the subframe.

17. The user equipment according to 16, wherein
the lengths of the TTIs in the subframe are user equipment (UE)-specific.

18. The user equipment according to 17, wherein the lengths of the TTIs in the subframe depend on UE's coverage situation.

19. The user equipment according to 16, wherein the lengths of the TTIs in the subframe are all the same; and if the lengths of the TTIs are not an exact divider of 14, at least two TTIs in the subframe are arranged to overlap each other, or some OFDM symbols in the subframe are not assigned to the TTIs.

20. The user equipment according to 16, wherein

If the subframe is a special or partial subframe, n bits of the bitmap are applied to indicate the candidate TTI(s), and n depends on the number of TTIs in the special or partial subframe.

21. A wireless communication method performed by a user equipment (UE) comprising:

determining valid transmission time interval(s) (TTI(s)) for a physical channel in a subframe based on the resource element (RE) number of each TTI in the subframe; and receiving the physical channel in one or more of the valid TTI(s) by blindly decoding part or all of the valid TTI(s), wherein each TTI comprises 1-7 orthogonal frequency division multiplexing (OFDM) symbols.

22. The wireless communication method according to 21, further comprising:

receiving a bitmap in the radio resource control (RRC) or medium access control (MAC) layer indicating candidate TTI(s) for the physical channel among the valid TTI(s), wherein the size of the bitmap is equal to the number of the valid TTI(s) in the subframe or the largest one of the numbers of valid TTI(s) in respective subframes available to the UE; and the one or more of the valid TTI(s) for transmitting the physical channel is among the candidate TTI(s), and the candidate TTI(s) are blindly decoded when receiving the physical channel.

23. The wireless communication method according to 22, wherein the same bitmap is used for different types of subframes, and the size of the bitmap is equal to the largest one of the numbers of valid TTI(s) in respective subframes available to the UE.

24. The wireless communication method according to 21, wherein all the valid TTI(s) are blindly decoded when receiving the physical channel.

25. The wireless communication method according to 21, further comprising:

determining that a set of TTIs in the subframe are valid TTIs if the total RE number of the set of TTIs is enough to transmit the physical channel in the case that the RE number of each individual TTI of the set of TTIs is not enough to transmit the physical channel, wherein the set of TTIs in combination are used to transmit the physical channel.

26. A wireless communication method performed by an eNode B (eNB), comprising:

determining valid transmission time interval(s) (TTI(s)) for a physical channel in a subframe based on the resource element (RE) number of each TTI in the subframe; and transmitting the physical channel in one or more of the valid TTI(s) to a user equipment (UE), wherein each TTI comprises 1-7 orthogonal frequency division multiplexing (OFDM) symbols.

27. The wireless communication method according to 26, further comprising:

transmitting a bitmap in the radio resource control (RRC) or medium access control (MAC) layer indicating candidate TTI(s) for the physical channel among the valid TTI(s) to the UE, wherein the size of the bitmap is equal to the number of the valid TTI(s) in the subframe or the largest one of the numbers of valid TTI(s) in respective subframes available to the UE, and the one or more of the valid TTI(s) for transmitting the physical channel is among the candidate TTI(s).

28. The wireless communication method according to 27, wherein the same bitmap is used for different types of subframes, and the size of the bitmap is equal to the largest one of the numbers of valid TTI(s) in respective subframes available to the UE.

29. The wireless communication method according to 26, wherein the physical channel is transmitted in one or more of the valid TTI(s) by taking all the valid TTI(s) as candidate TTI(s) for the physical channel.

30. The wireless communication method according to 26, further comprising:

determining that a set of TTIs in the subframe are valid TTIs if the total RE number of the set of TTIs is enough to transmit the physical channel in the case that the RE number of each individual TTI of the set of TTIs is not enough to transmit the physical channel, wherein the set of TTIs in combination are used to transmit the physical channel.

31. A wireless communication method performed by an eNode B (eNB) comprising:

generating a bitmap indicating candidate transmission time interval(s) (TTI(s)) for a physical channel in a subframe;

transmitting the bitmap in the radio resource control (RRC) or medium access control (MAC) layer;

transmitting the physical channel in one or more of the candidate TTI(s), wherein each TTI in the subframe comprises 1-7 orthogonal frequency division multiplexing (OFDM) symbols, and the size of the bitmap depends on the lengths of TTIs in the subframe.

32. The wireless communication method according to 31, wherein the lengths of the TTIs in the subframe are user equipment (UE)-specific.

33. The wireless communication method according to 32, wherein the lengths of the TTIs in the subframe depend on UE's coverage situation.

34. The wireless communication method according to 31, wherein the lengths of the TTIs in the subframe are all the same; and if the lengths of the TTIs are not an exact divider of 14, at least two TTIs in the subframe are arranged to overlap each other, or some OFDM symbols in the subframe are not assigned to the TTIs.

35. The wireless communication method according to 31, wherein

If the subframe is a special or partial subframe, n bits of the bitmap are applied to indicate the candidate TTI(s), and n depends on the number of TTIs in the special or partial subframe.

36. A wireless communication method performed by a user equipment (UE) comprising:

receiving a bitmap indicating candidate transmission time interval(s) (TTI(s)) for a physical channel in a subframe in the radio resource control (RRC) or medium access control (MAC) layer;

determining the candidate TTI(s) based on the bitmap; and receiving the physical channel in one or more of the candidate TTI(s) by blindly decoding the candidate TTI(s), wherein each TTI in the subframe comprises 1-7 orthogonal frequency division multiplexing (OFDM) symbols, and the size of the bitmap depends on the lengths of TTIs in the subframe.

37. The wireless communication method according to 36, wherein the lengths of the TTIs in the subframe are user equipment (UE)-specific.

38. The wireless communication method according to 37, wherein the lengths of the TTIs in the subframe depend on UE's coverage situation.

39. The wireless communication method according to 36, wherein the lengths of the TTIs in the subframe are all the same; and if the lengths of the TTIs are not an exact divider of 14, at least two TTIs in the subframe are arranged to overlap each other, or some OFDM symbols in the subframe are not assigned to the TTIs.

40. The wireless communication method according to 36, wherein

If the subframe is a special or partial subframe, n bits of the bitmap are applied to indicate the candidate TTI(s), and n depends on the number of TTIs in the special or partial subframe.

In addition, embodiments of the present disclosure can also provide an integrated circuit which comprises module(s) for performing the step(s) in the above respective communication methods. Further, embodiments of the present can also provide a computer readable storage medium having stored thereon a computer program containing a program code which, when executed on a computing device, performs the step(s) of the above respective communication methods.

The invention claimed is:

1. A user equipment (UE) comprising:
   circuitry operative to determine valid transmission time interval(s) (TTI(s)) from a plurality of TTIs for a physical channel in a subframe based on a total number of resource element(s) (RE(s)) in each of the plurality of TTIs in the subframe; and
   a receiver operative to receive the physical channel n one or more of the valid TTI(s) by blindly decoding part or all of the valid TTI(s),
   wherein each of the plurality of TTIs includes 1-7 orthogonal frequency division multiplexing (OFDM) symbols, and
   in a case where at least one of the plurality of TTIs include a total number of RE(s) that is equal to a total number of RE(s) utilized by the physical channel during transmission, a total number of RE(s) in each of the valid TTI(s) is equal to the total number of RE(s) utilized by the physical channel during transmission.

2. The user equipment according to claim 1, wherein
the receiver is further operative to receive a bitmap in a radio resource control (RRC) or a medium access control (MAC) layer,
the bitmap indicates candidate TTI(s) among the valid TTI(s),
the receiver is further operative to receive the physical channel in the candidate TTI(s) by blindly decoding the candidate TTI(s), and
a total number of bits of the bitmap is equal to a total number of the valid TTI(s) in the subframe or equal to the largest total number of valid TTI(s) of valid TTI(s) in respective subframes available to the UE.

3. The user equipment according to claim 2, wherein
the bitmap is used for different types of subframes, and
the total number of bits of the bitmap is equal to the largest total number of valid TTI(s) of valid TTI(s) in respective subframes available to the UE.

4. The user equipment according to claim 1, wherein
the receiver is operative to blindly decode all the valid TTI(s) when receiving the physical channel.

5. The user equipment according to claim 1, wherein in a case where none of the plurality of TTIs include a total number of RE(s) that is equal to the total number of RE(s) utilized by the physical channel during transmission, the circuitry is further operative to determine that a set of TTIs of the plurality of TTIs is are valid TTIs when a total number of RE(s) in the set of TTIs is equal to the total number of RE(s) utilized by the physical channel during transmission, wherein the set of TTIs in combination are used to transmit the physical channel.

6. An eNode B (eNB) comprising:
   circuitry operative to determine valid transmission time interval(s) (TTI(s)) from a plurality of TTIs for a physical channel in a subframe based on a total number of resource element(s) (RE(s)) in each of the plurality of TTIs in the subframe; and
   a transmitter operative to transmit the physical channel in one or more of the valid TTI(s) to a user equipment (UE), wherein each of the plurality of TTIs includes 1-7 orthogonal frequency division multiplexing (OFDM) symbols, and
   in a case where at least one of the plurality of TTIs include a total number of RE(s) that is equal to a total number of RE(s) utilized by the physical channel during transmission, a total number of RE(s) in each of the valid TTI(s) is equal to the total number of RE(s) utilized by the physical channel during transmission.

7. The eNode B according to claim 6, wherein
the transmitter is further operative to transmit a bitmap in a radio resource control (RRC) or a medium access control (MAC) layer,
the bitmap indicates candidate TTI(s) among the valid TTI(s) to the UE,
the transmitter is further operative to transmit the physical channel in the candidate TTI(s) to the UE, and
a total number of bits of the bitmap is equal to a total number of the valid TTI(s) in the subframe or equal to the largest total number of valid TTI(s) of valid TTI(s) in respective subframes available to the UE.

8. An eNode B (eNB) comprising:
   circuitry operative to generate a bitmap indicating candidate transmission time interval(s) (TTI(s)) from a plurality of TTIs for a physical channel in a subframe; and
   a transmitter operative to transmit the bitmap in a radio resource control (RRC) or a medium access control (MAC) layer, and transmit the physical channel in one or more of the candidate TTI(s),
   wherein each of the plurality of TTIs in the subframe includes 1-7 orthogonal frequency division multiplexing (OFDM) symbols, each of the plurality of TTIs in the subframe have a first length, a size of the bitmap depends on the first length, and in a case where the size of the bit map is not divisible by the first length, at least two TTIs in the subframe are arranged to overlap each other, or some OFDM symbols in the subframe are not assigned to the plurality of TTIs.

9. The eNode B according to claim 8, wherein the first length is user equipment (UE)-specific.

10. The eNode B according to claim 9, wherein the first length depends on UE's coverage situation.

11. The eNode B according to claim 8, wherein the first length is 14.

12. The eNode B according to claim 8, wherein in a case where the subframe is a special or partial subframe, n bits of the bitmap are applied to indicate the candidate TTI(s), and n depends on a number of TTIs in the special or partial subframe.

13. A user equipment (UE) comprising:

a receiver operative to receive a bitmap indicating candidate transmission time interval(s) (TTI(s)) from a plurality of TTIs for a physical channel in a subframe in a radio resource control (RRC) or a medium access control (MAC) layer; and circuitry operative to determine the candidate TTI(s) based on the bitmap, wherein the receiver is operative to receive the physical channel in one or more of the candidate TTI(s) by blindly decoding the candidate TTI(s), and each of the plurality of TTIs in the subframe includes 1-7 orthogonal frequency division multiplexing (OFDM) symbols, each of the plurality of TTIs in the subframe have a first length, a size of the bitmap depends on the first length, and in a case where the size of the bit map is not divisible by the first length, at least two TTIs in the subframe are arranged to overlap each other, or some OFDM symbols in the subframe are not assigned to the plurality of TTIs.

14. A wireless communication method performed by a user equipment (UE) comprising:

determining valid transmission time interval(s) (TTI(s)) from a plurality of TTIs for a physical channel in a subframe based on a total number of resource element(s) (RE(s)) in each of the plurality of TTIs in the subframe; and receiving the physical channel in one or more of the valid TTI(s) by blindly decoding part or all of the valid TTI(s), wherein each of the plurality of TTIs includes 1-7 orthogonal frequency division multiplexing (OFDM) symbols, and in a case where at least one of the plurality of TTIs include a total number of RE(s) that is equal to a total number of RE(s) utilized by the physical channel during transmission, a total number of RE(s) in each of the valid TTI(s) is equal to the total number of RE(s) utilized by the physical channel during transmisison.

15. A wireless communication method performed by an eNode B (eNB), comprising:

determining valid transmission time interval(s) (TTI(s)) from a plurality of TTIs for a physical channel in a subframe based on a total number of resource elements (RE(s)) in each of the plurality of TTIs is in the subframe; and transmitting the physical channel in one or more of the valid TTI(s) to a user equipment (UE), wherein each of the plurality of TTIs includes 1-7 orthogonal frequency division multiplexing (OFDM) symbols, and in a case where at least one of the plurality of TTIs include a total number of RE(s) that is equal to a total number of RE(s) utilized by the physical channel during transmission, a total number of RE(s) in each of the valid TTI(s) is equal to the total number of RE(s) utilized by the physical channel during transmission.

16. A wireless communication method performed by an eNode B (eNB) comprising:

generating a bitmap indicating candidate transmission time interval(s) (TTI(s)) from a plurality of TTIs for a physical channel in a subframe;

transmitting the bitmap in a radio resource control (RRC) or a medium access control (MAC) layer;

transmitting the physical channel in one or more of the candidate TTI(s), wherein each of the plurality of TTIs in the subframe includes 1-7 orthogonal frequency division multiplexing (OFDM) symbols, each of the plurality of TTIs in the subframe have a first length, a size of the bitmap depends on the first length, and in a case where the size of the bit map is not divisible by the first length, at least two TTIs in the subframe are arranged to overlap each other, or some OFDM symbols in the subframe are not assigned to the plurality of TTIs.

17. A wireless communication method performed by a user equipment (UE) comprising:

receiving a bitmap indicating candidate transmission time interval(s) (TTI(s)) from a plurality of TTIs for a physical channel in a subframe in a radio resource control (RRC) or a medium access control (MAC) layer;

determining the candidate TTI(s) based on the bitmap; and receiving the physical channel in one or more of the candidate TTI(s) by blindly decoding the candidate TTI(s), wherein each of the plurality of TTIs in the subframe includes 1-7 orthogonal frequency division multiplexing (OFDM) symbols, each of the plurality of TTIs in the subframe have a first length, a size of the bitmap depends on the first length, and in a case where the size of the bit map is not divisible by the first length, at least two TTIs in the subframe are arranged to overlap each other, or some OFDM symbols in the subframe are not assigned to the plurality of TTIs.

* * * * *